(12) United States Patent
Renkis

(10) Patent No.: US 11,477,606 B2
(45) Date of Patent: Oct. 18, 2022

(54) LOCATION-BASED SOCIAL NETWORKING

(71) Applicant: William I. Renkis, Nashville, TN (US)

(72) Inventor: William I. Renkis, Nashville, TN (US)

( * ) Notice: Subject to any disclaimer, the term of this patent is extended or adjusted under 35 U.S.C. 154(b) by 23 days.

(21) Appl. No.: 17/212,361

(22) Filed: Mar. 25, 2021

(65) Prior Publication Data
US 2021/0306798 A1   Sep. 30, 2021

Related U.S. Application Data

(60) Provisional application No. 62/994,564, filed on Mar. 25, 2020.

(51) Int. Cl.
| | | |
|---|---|---|
| *H04W 4/02* | (2018.01) | |
| *H04W 4/029* | (2018.01) | |
| *H04W 12/06* | (2021.01) | |
| *G06Q 50/00* | (2012.01) | |
| *G06F 21/32* | (2013.01) | |
| *H04W 8/00* | (2009.01) | |
| *G06F 16/9536* | (2019.01) | |
| *H04L 51/52* | (2022.01) | |

(52) U.S. Cl.
CPC ........ *H04W 4/023* (2013.01); *G06F 16/9536* (2019.01); *G06F 21/32* (2013.01); *G06Q 50/01* (2013.01); *H04L 51/52* (2022.05); *H04W 4/029* (2018.02); *H04W 8/005* (2013.01); *H04W 12/06* (2013.01)

(58) Field of Classification Search
CPC .............................. H04L 51/222; H04W 4/02
USPC ................... 455/456.1, 456.3, 41.2; 370/310
See application file for complete search history.

(56) References Cited

U.S. PATENT DOCUMENTS

| | | | |
|---|---|---|---|
| 8,108,414 B2 * | 1/2012 | Stackpole | ............... H04L 67/52 |
| | | | 707/758 |
| 8,958,830 B2 | 2/2015 | Chawla | |
| 8,965,409 B2 | 2/2015 | Abhyanker | |
| 9,204,247 B2 | 12/2015 | Liu et al. | |
| 10,122,772 B2 | 11/2018 | Odio et al. | |
| 10,547,970 B1 * | 1/2020 | Zheng | ................... H04W 4/021 |
| 2009/0215469 A1 | 8/2009 | Fisher et al. | |
| 2014/0289140 A1 | 9/2014 | Vijayant | |
| 2015/0242969 A1 * | 8/2015 | Pallas | .................... B67D 7/145 |
| | | | 705/39 |
| 2015/0245168 A1 | 8/2015 | Martin | |
| 2015/0304368 A1 | 10/2015 | Vaccari et al. | |
| 2017/0345022 A1 | 11/2017 | Tseng et al. | |

* cited by examiner

*Primary Examiner* — Kiet M Doan
(74) *Attorney, Agent, or Firm* — NEO IP

(57) ABSTRACT

A location-based social networking application enables users to communicate and interact with one another only when they are in proximity to one another. The social networking features and functionality enables users to securely communication and interact with other users, without providing an exact or current location. The application further includes account management functionality, chat functionality, and commerce functionality.

17 Claims, 9 Drawing Sheets

FIG. 6

LOCATION-BASED SOCIAL NETWORKING

CROSS REFERENCES TO RELATED APPLICATIONS

This application is related to and claims priority from the following U.S. patents and patent applications. This application claims the benefit of U.S. Provisional Application No. 62/994,564, filed Mar. 25, 2020, which is incorporated herein by reference in its entirety.

BACKGROUND OF THE INVENTION

1. Field of the Invention

The present invention relates to social networking, and more specifically to location-based communications.

2. Description of the Prior Art

It is generally known in the prior art to provide systems and methods for social networks with location-based features, including determining mobile device physical locations, as well as enabling communication and privacy features based on determined locations. However, while these systems and methods may provide location-based features generally, these systems and methods fail to incorporate adequate user data protection functionality.

Prior art patent documents include the following:

U.S. Patent Publication No. 2015/0304368 for sharing locations with friends on online social networks by inventor Vaccari, et al., filed Jul. 3, 2014 and published Oct. 22, 2015, is directed to a mobile client system of a first user may determine a first location of the mobile client system, where the first user corresponds to a first node of a social graph of the online social network, the social graph comprises a plurality of nodes and a plurality of edges connecting the nodes, and each of the edges between two of the nodes represents a single degree of separation between them. The mobile client system may send an indication of the first location and one or more and one or more notification preferences to a computing system associated with the online social network. The mobile client system may receive a notification referencing one or more second users of the online social network, where each second user is associated with a mobile client system having a second location within a threshold distance of the first location.

U.S. Patent Publication No. 2009/0215469 for a device, system, and method of generating location-based social networks by inventor Fisher, et. al, filed Feb. 27, 2008 and published Aug. 27, 2009, is directed to a device, system, and method of generating location-based social networks. For example, a method for dynamically creating location-based virtual social networks includes: detecting presence of a wireless device at a location which is associated with a location-based virtual social network; and sending to the wireless device an invitation to join said location-based virtual social network.

U.S. Pat. No. 8,958,830 for location based presence and privacy management by inventor Chawla, filed Sep. 22, 2011, and issued Feb. 17, 2015, is directed to a method and system for providing location based presence status and enhancing location privacy management in a mobile, instant messaging or social networking environment. A user specifies or saves their favorite locations (e.g. home, work, school, or particular business or point of interest locations), and specifies or selects names and/or categories to be shared for each user-specified location. In addition, the system provides multiple sharing levels for sharing multiple types of location contextual information. When user's current location corresponds to user-specified locations, location based presence status is provided to specified contacts according to the sharing level settings, and provides user the option to share location contextual information without sharing location coordinates of the user. When user is driving, location based presence status is updated accordingly, and when user is at other business or POI locations, corresponding location contextual information is shared based on user's settings for each sharing level.

U.S. Pat. No. 8,108,414 for dynamic location-based social networking by inventor Stackpole, filed Nov. 28, 2007 and issued Jan. 31, 2012, is directed to a method and system for establishing a location based social networking is provided. A client application is provided on a communications device of a user seeking to establish the location based social network. The user creates a personal profile and a preference profile using the client application. The preference profile refers to characteristics the user seeks in potential members of the location based social network. The user transfers the personal and preference profiles to the social networking server which registers a location and range selected by the user. The social networking server identifies potential members within the registered location and range by matching the personal profile of each of the potential members with the preference and personal profiles of the user. The social networking server provides communications link between the user and the identified potential members upon mutual confirmation between the user and the identified potential members.

U.S. Patent Publication No. 2015/0245168 for systems, devices and methods for location-based social networks by inventor Martin, filed Feb. 25, 2014 and published Aug. 27, 2015, is directed to Global Positioning System (GPS) data and/or functionality of various users' mobile devices may be used to enable the users to share with their friends or contacts their current location in real time or near real time. There may be an individual graphical marker for each user that is presented on a map corresponding to the current location of the user's device. The graphical marker may represent an online social network identity of the user. This interactive graphical marker is presented at a location on the map corresponding to the current physical location of the user's device based on the associated GPS data and/or other location data. If the location of the device moves, this is shown on the map by the associated graphical marker making corresponding movements on the map. A user may set a beacon on the map at a location at which an event is to occur and connections or friends of the user will be sent information indicative of the location on the map and associated GPS directions. The user can select any associated graphical marker on the map and receive information or video chat and/or messaging services related to the user whose online social network identity is represented by the graphical marker.

U.S. Patent Publication No. 2014/0289140 for systems and methods of opportunistically identifying networking prospects by inventor Vijayant, filed Jan. 3, 2014, and published Sep. 25, 2014, is directed to the technology disclosed relates to automatically suggesting rendezvous with nearby networking prospects. In particular, it relates to opportunistically filling a user's free time with business networking activities by identifying other users that are in geographic proximity to the user and meet the user's business preferences for business networking activities.

U.S. Pat. No. 9,204,247 for proximity-based notifications for photos by inventor Liu, et al., filed Aug. 13, 2012 and issued Dec. 1, 2015, is directed to various aspects of the subject technology relate to systems, methods, and machinereadable media for a proximity-based notification. A system may be configured to receive user location information for a user and member location information for a member of a social graph belonging to the user, determining, based on the user location information and the member location information, that the member is located within a threshold distance of the user, and generating a notification to the user based on photographs that include both the user and the member.

U.S. Pat. No. 8,965,409 for user-generated community publication in an online neighborhood social network by inventor Abbyanker, filed Apr. 28, 2014 and issued Feb. 24, 2015, is directed to a method of user-generated community publication in an online neighborhood social network is disclosed. In one embodiment, a method comprising generating an online neighborhood social network in which residents are represented as users, and in which residents have associated meta-data indicating at least one of a verified physical location and a privacy setting of the users; automatically generating a community publication based on the article submitted by a community journalist at a periodically occurring interval, wherein the community journalist is a resident of a private neighborhood constrained only to neighbors living in the private neighborhood through the online neighborhood social network; and publishing the community publication in the geospatial environment to targeted users distributable to an electronic location of at least a subset of the targeted users subscribing to the community publication when the electronic location is available in the private neighborhood of the online neighborhood social network.

U.S. Pat. No. 10,122,772 for dynamically-created shared spaces by inventor Odio, et. al, filed Apr. 28, 2014 and issued Nov. 6, 2018, is directed to a social networking system automatically create a shared space for posting requests to the social networking system from multiple users based on social, spatial and temporal proximity, and create a news feed corresponding to the shared space.

U.S. Patent Publication No. 2017/0345022 for displaying social opportunities by location on a map by inventor Tseng, et. al, filed May 17, 2017 and published Nov. 30, 2017, is directed to a social networking system provides relevant content objects at the request of social networking system users. Relevance scores are determined for content objects by matching user location, user interests, and other social information to the content, location, and timing associated with content objects. A ranked list of content objects can be provided to the user, where the content objects are relevant to them based on their interests, location, and other social information. The system provides a user interface that displays a map containing pins, where each pin represents a content object in actionable proximity to a user. The content objects selected to be presented as pins to the user are those content objects with sufficiently high relevance scores. Multiple pins for a nearby area can be clustered. The user can switch between zoom levels for the map, thereby showing pins at varying distances from the user's current location.

SUMMARY OF THE INVENTION

The present invention relates to social networking, and more specifically to location-based communications.

It is an object of this invention to provide a location-based social networking application with improved privacy settings and user data protection functionality. These settings and functionality specifically address issues associated with sharing geographic location data. Specifically, the present invention addresses issues associated with user communications, privacy, and sharing geographic location data, as users often seek privacy-related features to minimize the amount of data shared with networks, third-parties, and other users.

In one embodiment, the present invention provides a system for a location-based social network including at least one server computer including a processor, a memory, and at least one database, a mobile device, wherein the mobile device includes an application, and at least one other mobile device, wherein the at least one other mobile device includes the application, wherein the at least one server computer is in network communication with the mobile device and the at least one other mobile device, wherein an account associated with the mobile device is linked to at least one other account associated with the at least one other mobile device, wherein the at least one database includes device and user data, and wherein the device and user data includes location data, wherein the application includes a graphical user interface (GUI), wherein the GUI includes a visual representation of a proximity of the mobile device to the at least one other mobile device, and wherein the application is further operable to provide account management functionality, chat functionality, and commerce functionality.

In another embodiment, the present invention provides a system for a location-based social network including at least one server computer including a processor, a memory, and at least one database, a mobile device, wherein the mobile device includes an application, and at least one other mobile device, wherein the at least one other mobile device includes the application, wherein the at least one server computer is in network communication with the mobile device and the at least one other mobile device, wherein an account associated with the mobile device is linked to at least one other account associated with the at least one other mobile device, wherein the at least one database includes device and user data, and wherein the device and user data includes location data, wherein the location data is created via a global positioning system (GPS), a beacon, a wireless network, radio frequency (RF), RF identification (RFID), near field communication (NFC), an internet protocol (IP) address, magnetic positioning, and/or cellular triangulation, wherein the application includes a graphical user interface (GUI), wherein the GUI includes a visual representation of a proximity of the mobile device to the at least one other mobile device, wherein the mobile device and the at least one other mobile device are provided simultaneously with a notification in real time that the mobile device and the at least one other mobile device are within a predetermined proximity, and wherein the application is further operable to provide account management functionality, chat functionality, and commerce functionality.

In yet another embodiment, the present invention provides a system for a location-based social network including at least one server computer including a processor, a memory, and at least one database, a mobile device, wherein the mobile device includes an application, and at least one other mobile device, wherein the at least one other mobile device includes the application, wherein the at least one server computer is in network communication with the mobile device and the at least one other mobile device, wherein an account associated with the mobile device is linked to at least one other account associated with the at least one other mobile device, wherein the at least one database includes device and user data, and wherein the device and user data includes location data, wherein the location data is created via a global positioning system (GPS), a beacon, a wireless network, radio frequency (RF), RF identification (RFID), near field communication (NFC), an internet protocol (IP) address, magnetic positioning, and/or cellular triangulation, wherein the application includes a graphical user interface (GUI), wherein the GUI includes a visual representation of a proximity of the mobile device to the at least one other mobile device when the mobile device is within a predetermined proximity to the at least one other mobile device, wherein the application is operable to blackout sharing the location data for at least one blackout location, and wherein a radius around the at least one blackout location is user defined, and wherein the application is further operable to provide account management functionality, chat functionality, and commerce functionality.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 6 illustrates a GUI for a public menu according to one embodiment of the present invention.

DETAILED DESCRIPTION

Figure 1:
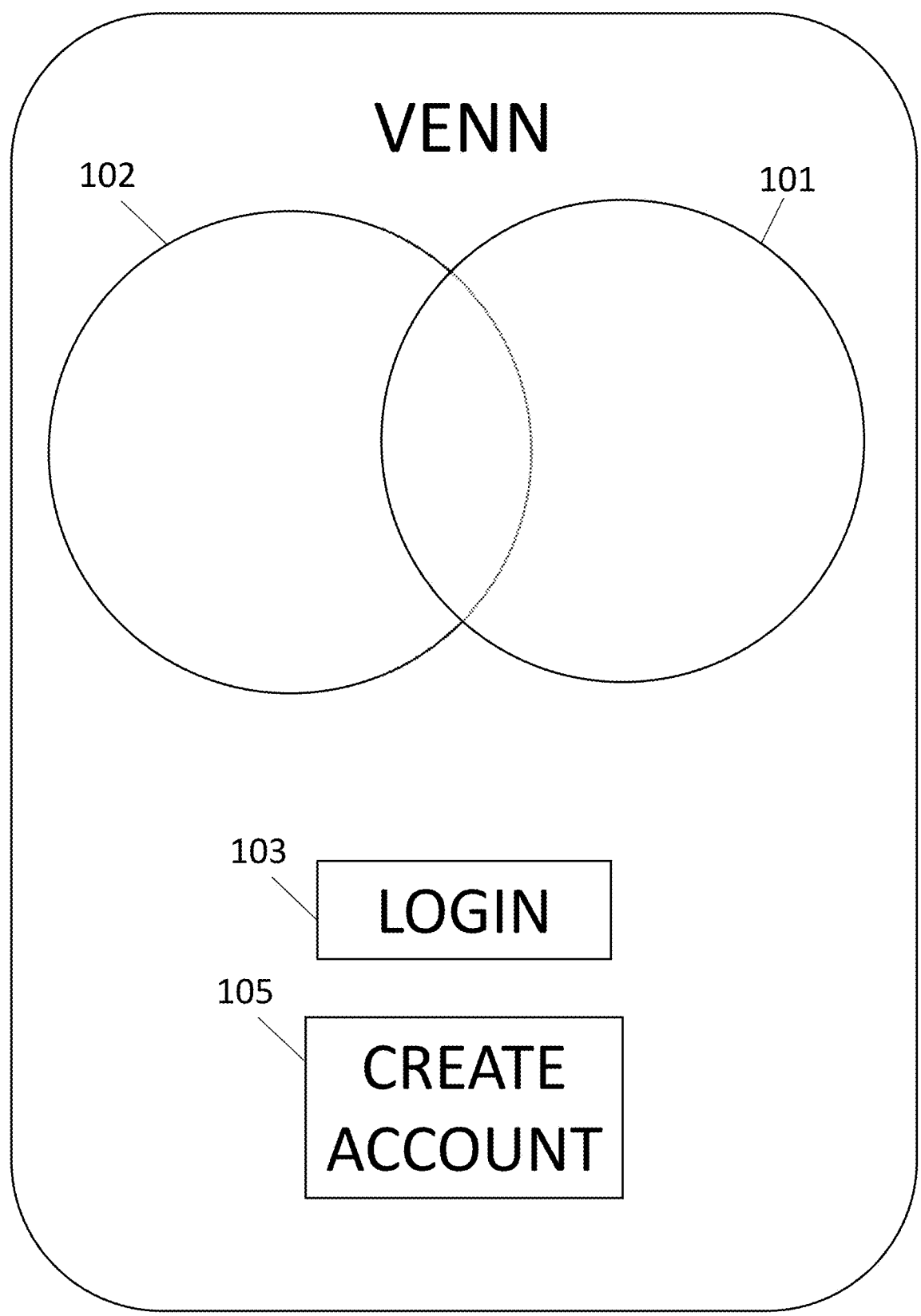
FIG. 1 illustrates a Graphical User Interface (GUI) for a login and account creation menu according to one embodiment of the present invention.

The present invention is generally directed to systems and methods for a location-based social network. The invention generally includes systems and methods for communication between users when users are in proximity to one another. The systems and methods of the present invention provide for improved accessibility and privacy functionality with a location-based social network.

In one embodiment, the present invention provides a system for a location-based social network including at least one server computer including a processor, a memory, and at least one database, a mobile device, wherein the mobile device includes an application, and at least one other mobile device, wherein the at least one other mobile device includes the application, wherein the at least one server computer is in network communication with the mobile device and the at least one other mobile device, wherein an account associated with the mobile device is linked to at least one other account associated with the at least one other mobile device, wherein the at least one database includes device and user data, and wherein the device and user data includes location data, wherein the application includes a graphical user interface (GUI), wherein the GUI includes a visual representation of a proximity of the mobile device to the at least one other mobile device, and wherein the application is further operable to provide account management functionality, chat functionality, and commerce functionality. In one embodiment, the mobile device is a smart phone, a mobile phone, a laptop computer, a tablet, or a phablet. In one embodiment, the at least one database further includes application data for the application. In one embodiment, the application is accessed using biometric information. In one embodiment, the mobile device and the at least one other mobile device are provided simultaneously with a notification in real time that the mobile device and the at least one other mobile device are within a predetermined proximity. In one embodiment, the application is operable to blackout sharing the location data for at least one blackout location, and wherein a radius around the at least one blackout location is user defined. In one embodiment, the location data is created via a global positioning system (GPS), a beacon, a wireless network, radio frequency (RF), RF identification (RFID), near field communication (NFC), an internet protocol (IP) address, magnetic positioning, and/or cellular triangulation. In one embodiment, the at least one other account includes at least two accounts, wherein the application is operable to provide at least two tiers for the at least two accounts, wherein each of the at least two tiers is associated with a corresponding predetermined proximity, and wherein the application provides notifications based on the corresponding predetermined proximity. In one embodiment, the account includes a user name, a password, an image associated with the account, privacy preferences, a gender, a residency, a mailing address, and/or a date of birth. In one embodiment, the application is a web-browser based application operable to be accessed through a web browser running on the mobile device. In one embodiment, the application is a mobile application installed on the mobile device. In one embodiment, the visual representation of the proximity of the mobile device to the at least one other mobile device includes a first circle and a second circle, wherein the first circle represents the mobile device and the second circle represents the at least one other mobile device, wherein the first circle and the second circle overlap or touch when the proximity is within a predetermined proximity, and wherein the first circle and the second circle do not overlap or touch when the proximity is greater than the predetermined proximity. In one embodiment, the visual representation includes a name, a user name, and/or an image associated with the at least one other account. In one embodiment, the visual representation of the proximity of the mobile device to the at least one other mobile device is displayed in order of increasing distance.

In another embodiment, the present invention provides a system for a location-based social network including at least one server computer including a processor, a memory, and at least one database, a mobile device, wherein the mobile device includes an application, and at least one other mobile device, wherein the at least one other mobile device includes the application, wherein the at least one server computer is in network communication with the mobile device and the at least one other mobile device, wherein an account associated with the mobile device is linked to at least one other account associated with the at least one other mobile device, wherein the at least one database includes device and user data, and wherein the device and user data includes location data, wherein the location data is created via a global positioning system (GPS), a beacon, a wireless network, radio frequency (RF), RF identification (RFID), near field communication (NFC), an internet protocol (IP) address, magnetic positioning, and/or cellular triangulation, wherein the application includes a graphical user interface (GUI), wherein the GUI includes a visual representation of a proximity of the mobile device to the at least one other mobile device, wherein the mobile device and the at least one other mobile device are provided simultaneously with a notification in real time that the mobile device and the at least one other mobile device are within a predetermined proximity, and wherein the application is further operable to provide account management functionality, chat functionality, and commerce functionality. In one embodiment, the mobile device is a smart phone, a mobile phone, a laptop computer, a tablet, or a phablet. In one embodiment, the application is operable to blackout sharing the location data for at least one blackout location, and wherein a radius around the at least one blackout location is user defined. In one embodiment, the visual representation of the proximity of the mobile device to the at least one other mobile device includes a first circle and a second circle, wherein the first circle represents the mobile device and the second circle represents the at least one other mobile device, wherein the first circle and the second circle overlap or touch when the proximity is within the predetermined proximity, and wherein the first circle and the second circle do not overlap or touch when the proximity is greater than the predetermined proximity.

In yet another embodiment, the present invention provides a system for a location-based social network including at least one server computer including a processor, a memory, and at least one database, a mobile device, wherein the mobile device includes an application, and at least one other mobile device, wherein the at least one other mobile device includes the application, wherein the at least one server computer is in network communication with the mobile device and the at least one other mobile device, wherein an account associated with the mobile device is linked to at least one other account associated with the at least one other mobile device, wherein the at least one database includes device and user data, and wherein the device and user data includes location data, wherein the location data is created via a global positioning system (GPS), a beacon, a wireless network, radio frequency (RF), RF identification (RFID), near field communication (NFC), an internet protocol (IP) address, magnetic positioning, and/or cellular triangulation, wherein the application includes a graphical user interface (GUI), wherein the GUI includes a visual representation of a proximity of the mobile device to the at least one other mobile device when the mobile device is within a predetermined proximity to the at least one other mobile device, wherein the application is operable to blackout sharing the location data for at least one blackout location, and wherein a radius around the at least one blackout location is user defined, and wherein the application is further operable to provide account management functionality, chat functionality, and commerce functionality. In one embodiment, the visual representation of the proximity of the mobile device to the at least one other mobile device includes a first circle and a second circle, wherein the first circle represents the mobile device and the second circle represents the at least one other mobile device, wherein the first circle and the second circle overlap or touch when the proximity is within a predetermined proximity, and wherein the first circle and the second circle do not overlap or touch when the proximity is greater than the predetermined proximity.

Instant messaging has evolved from the days of AOL Instant Messenger in the late 1990s. Now, an increasing number of conversations are taking place with the assistance of messaging applications available from a wide variety of sources. While many people today remain in regular contact with one another, it can be overwhelming when trying to communicate with a large number of contacts. Location-based, or proximity-based, social networking and messaging is a solution to this. Location-based social networking and messaging limits the number of contacts users are able to communicate with at a given time and enables users to organize events and meetups with only those users who are nearby. However, many location-based social network functionalities require a user's exact location and often broadcast a user's exact location to other nearby users.

Furthermore, despite the existence of endless messaging applications, there are often deficiencies in security. It is difficult to guarantee that no one else has access to messages and conversations. In addition, many of the currently available applications are equivalent to using unencrypted email and are just as insecure. Therefore, there is a need for a location-based social network able to provide greater user data protection and security.

Referring now to the drawings in general, the illustrations are for the purpose of describing one or more preferred embodiments of the invention and are not intended to limit the invention thereto.

The present invention includes a location-based social network operable to facilitate communication between users when users are in proximity to one another while providing for improved accessibility and privacy functionality with a location-based social network. The location-based social network generally includes a server computer including a processor and a memory in network communication with a mobile device running an application. The server computer preferably includes a database including device and user data, including location data. The application on the mobile device includes a graphical user interface (GUI) which includes visual representations of the proximity of other mobile devices to the mobile device as well as account management functionality, chat functionality, and commerce functionality.

The mobile device of the present application includes any mobile device known in the art, including but not limited to smart phones, mobile phones, laptop computers, tablets, phablets, etc. The mobile device of the present application is connected to at least one server computer including a processor and a memory, with the server computer in network communication with the mobile device. Application data for the mobile application running on the mobile device is preferably stored on one or more databases of the server computer. Alternatively, application data is stored on the cloud or on edge nodes.

The application of the present invention is preferably installed on the mobile device. Alternatively, the application is a web-browser based application operable to be accessed through a web browser running on the mobile device.

FIG. 1 illustrates a Graphical User Interface (GUI) for a login and account creation menu according to one embodiment of the present invention. Specifically, FIG. 1 includes a home page of the application with two overlapping circles, with the right circle 101 representing a mobile device running the application and the left circle 102 representing mobile devices which are present within a predetermined proximity of the mobile device. FIG. 1 also illustrates two buttons including a login button 103 and a create account 105 button. The login button 103 is operable to cause the GUI of the mobile device to display a login screen where the mobile device receives a username and password for login. Alternatively, login is performed using biometric information such as fingerprints obtained through a fingerprint scanner of the mobile device or biometric information obtained through a camera of the mobile device such as facial recognition or iris or retina recognition. The create account button 105 is operable to cause the GUI of the mobile device to display a create account page where the mobile device receives details sufficient to create an account for the application. These details include, by way of example and not limitation, user name, password, an avatar, photograph or other image associated with the account, privacy preferences, gender, residency, mailing address, date of birth, and any other relevant information.

Figure 2:
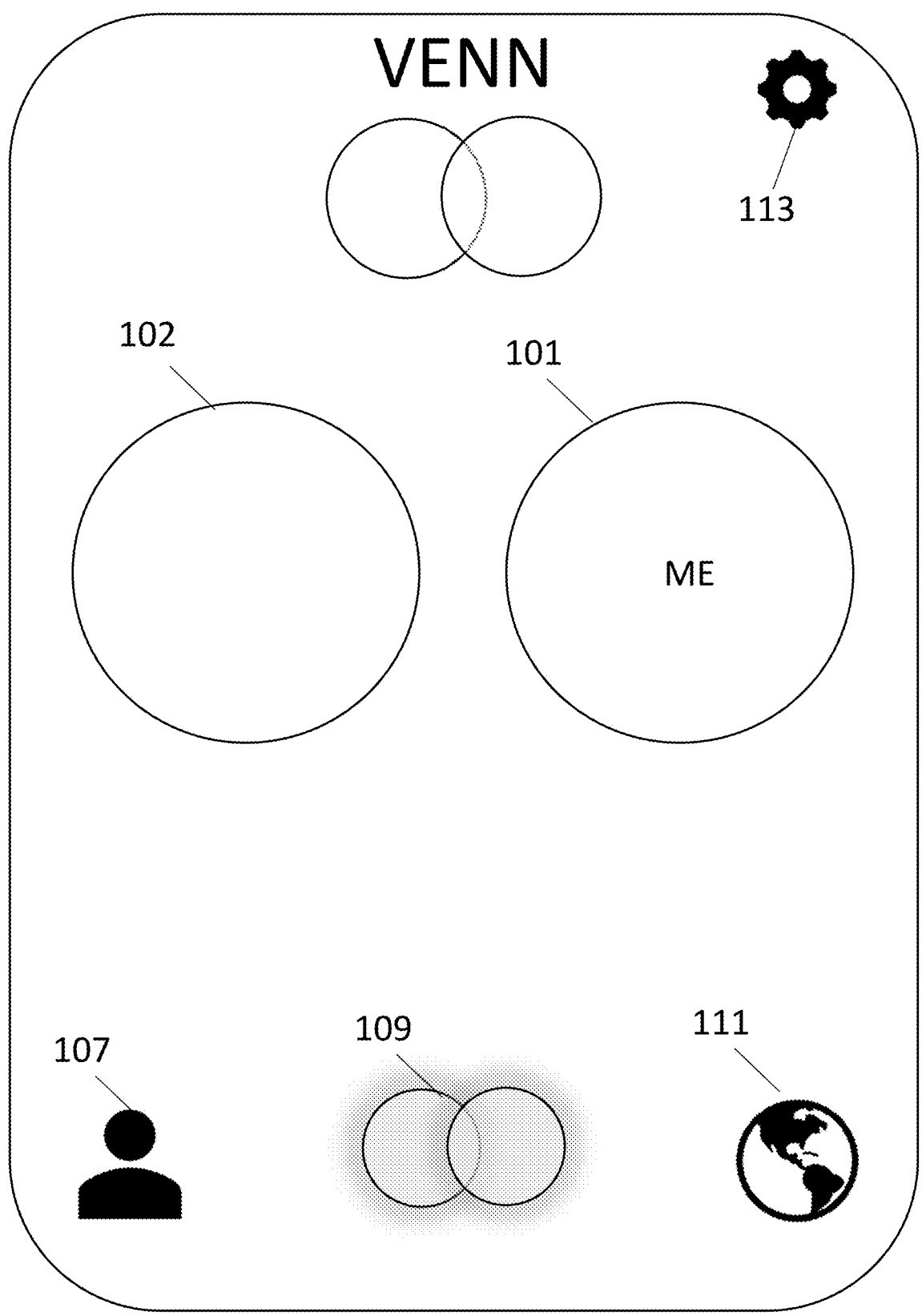
FIG. 2 illustrates a GUI when no other mobile devices are within the proximity of the mobile device according to one embodiment of the present invention.

FIG. 2 illustrates a home page of the GUI when no other mobile devices are within the proximity of the mobile device according to one embodiment of the present invention. The right circle 101 including the text "ME" represents the mobile device which is running the mobile application. The left circle 102 represents one or more other mobile devices. When no other mobile devices are within a predetermined proximity of the mobile device running the mobile application, the circle representing the mobile device running the mobile application 101 and the circle representing the one or more other mobile devices 102 do not overlap or touch. The GUI of FIG. 2 also includes a head and shoulders icon 107, a Venn icon 109, and an Earth icon 111. The head and shoulders icon 107 is configured to redirect to a friends page of the mobile application when the head and shoulders icon 107 is activated, such as through touch. Alternatively, the friends page is accessed by swiping right from the home page. The Venn icon 109 represents the home page. In FIG. 2, the Venn icon 109 emits a glow to indicate that the GUI is currently displaying the home page. Preferably, the glow is white. The mobile application is operable to redirect to the home page through activation of the Venn icon 109, such as through touch. The Earth icon 111 is configured to redirect to a public page of the mobile application when the Earth icon 111 is activated, such as through touch. Alternatively, the public page is accessed by swiping left from the home page. The GUI of FIG. 2 also includes a settings button 113 providing functionality for updating preferences associated with the application.

Figure 3:
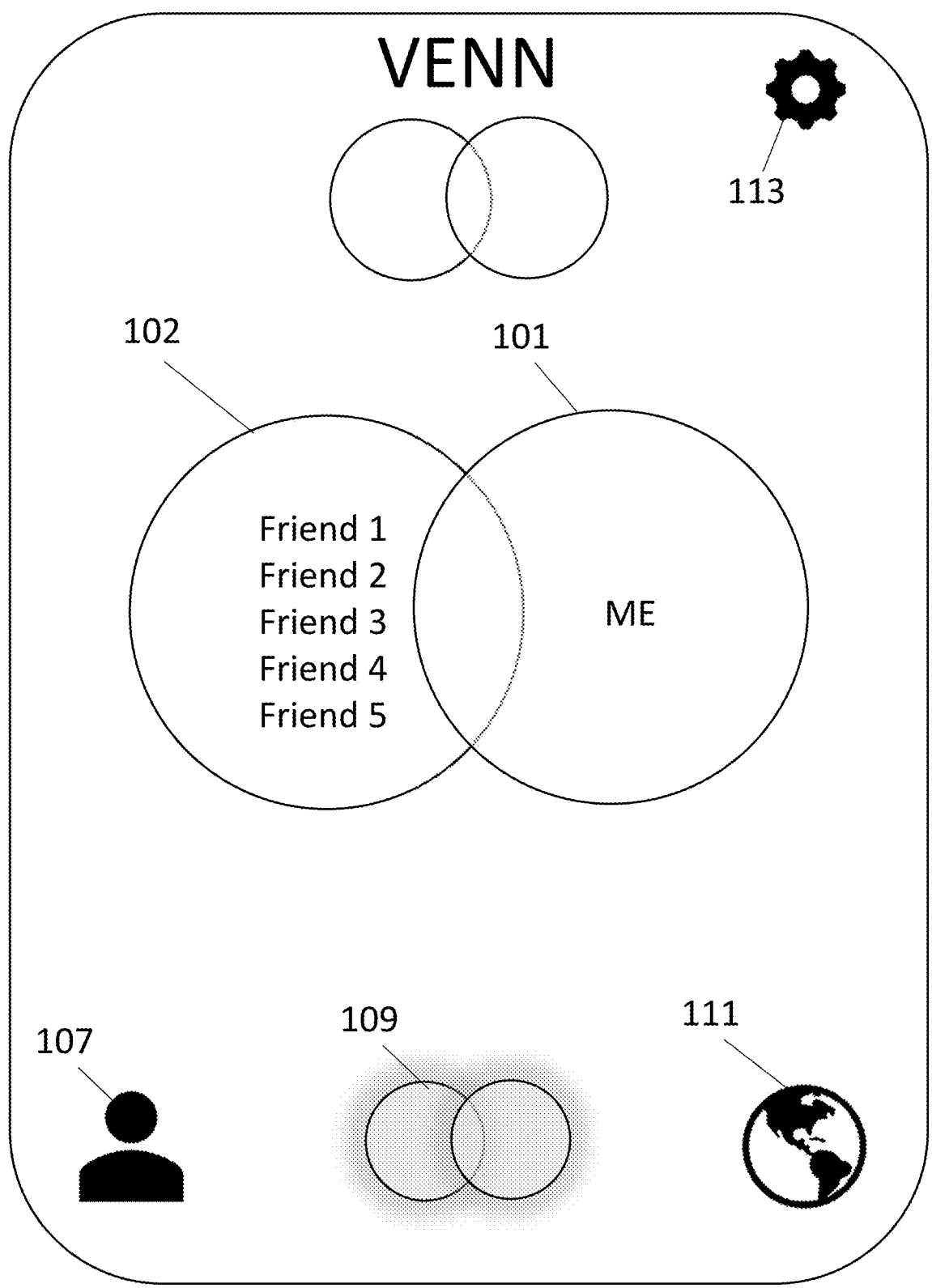
FIG. 3 illustrates a GUI indicating nearby users according to one embodiment of the present invention.

FIG. 3 illustrates a home page of the GUI indicating nearby friend users according to one embodiment of the present invention. The mobile device running the mobile application is within a predetermined proximity of five friends in FIG. 3 as evidenced by the overlap of the right-hand circle including the text "ME" with the left-hand circle including the text "Friend 1", "Friend 2", "Friend 3", "Friend 4", and "Friend 5". Preferably, a name of each of the friends is displayed in the left-hand circle when the mobile devices associated with these friends are within a predetermined proximity of the mobile device running the application. Alternatively, or additionally, other representations of these mobile devices are included within the left-hand circle such as images (e.g., emojis, avatars, photographs, etc.) or usernames. If there are too many usernames or names to fit within the left circle 102, an arrow pointing down or other icon (e.g., an ellipsis) appears below the last name. Upon interaction with the arrow or other icon, a full list of the usernames or names of the nearby friend users is displayed in a pop-up window on the home page. Chat functionality is enabled through the pop-up window through touch activation of a username, an avatar, or another image associated with the username displayed in the pop-up window. The pop-up window is configured to include scrolling functionality if there are too many friend users to fit in the pop-up window. Preferably, the pop-up window is a larger circle that overlays the home page of the GUI. However, the pop-up window is operable to be any shape. Usernames or other representations of mobile devices which are the closest to the mobile device running the application are operable to be listed first in a list or to be positioned within the left circle the closest to the right-hand circle representing the mobile device running application. In another embodiment, usernames or other representations of mobile devices are operable to be listed in order of distance (shortest to longest). Alternatively, the usernames or other representations of mobile devices are operable to be displayed in order of closeness to the mobile device within the left-hand circle. In one embodiment, a user of the application also receives a separate notification in real-time when a friend user comes within the predetermined distance of the mobile device running the application. The friend user also receives this separate notification in real-time. This notification is operable to be a notification in a pop-up window within the application or is operable to be a notification that is displayed in a notification area of the device running the application.

Notably, the present invention provides notification that one or more devices associated with friend accounts are within a predetermined proximity of a device, but does not provide the exact location of the mobile devices associated with the friend accounts. Furthermore, the present invention does not provide relative locations of the mobile devices associated with the friend accounts, but rather provides radius-based location services which indicate only that the radius of a circle formed by an area around another device intersects with the radius of a circle formed around the mobile device of the user. The radius of the circle around a device is half of the distance of the predetermined proximity described below.

The predetermined proximity between the mobile device and another mobile device required for the GUI to indicate that these devices are within a predetermined proximity of each other is 500 feet or approximately 500 feet according to one embodiment of the present invention. The radius of the circle formed around each device is 250 feet or about 250 feet in this embodiment such that when the radiuses of the circles overlap, the devices are within 500 feet or within approximately 500 feet from each other. Advantageously, a distance such as 500 feet provides for notification of proximity of friend account devices when in a vehicle and not just when users of the application are walking. This has been a challenge in the prior art as vehicles typically do not stay in one place for very long or move quickly such that smaller ranges than 500 feet are not sufficient to capture friend accounts running on devices in moving vehicles. However, the predetermined proximity is operable to be any distance according to another embodiment of the present invention. In one embodiment, the predetermined proximity is selected from available predetermined proximity options by a user of the mobile application running on the mobile device. Alternatively, the predetermined proximity is user-defined. Alternatively, the mobile application is operable to receive indications of "tiers" for different friends of the user. These tiers indicate permissions the user of the mobile application grants to friends of the user regarding notifications to the friends about the proximity of the mobile device running the mobile application to the other mobile devices. By way of example, other mobile devices which are given first tier or preferred tier status by the mobile device are operable to receive notifications or for the GUIs on these other mobile applications to indicate when the mobile device is within 1000 feet of the other mobile devices. Continuing with this example, a second tier grants other mobile devices permission to receive notifications or for the GUIs on these other mobile applications to indicate when the mobile device is within 500 feet of the other mobile devices. In one embodiment, the proximity requirement is customizable for each tier. Significantly, the mobile device running the application and a friend user of the user of the mobile device are notified in real time and at the same time that the users are within the predetermined proximity of each other, regardless of how big or small the proximity.

The application of the present invention also provides for blacking out locations or preventing sharing of locations with other devices when the mobile device is in those locations. By way of example, places where many devices which are friends with each other through the application such as schools, workplaces, churches, etc. are blackout locations. In another example, the application of the present invention provides privacy protection by blacking out a home or work location for an account. In another alternative, sensitive locations such as doctors' offices, therapist offices, etc. are blacked out. The present invention provides for a user to define a radius around each of these blackout locations where the mobile application will not share the location of the mobile device with other mobile devices. By way of example and not limitation, the radii for blackout locations include approximately 250 feet, approximately 500 feet, approximately 750 feet, approximately 1000 feet, approximately 2000 feet, approximately 5000 feet, etc. Preferably, each blackout location has a customizable radius, with the radius being customizable for any distance. The application of the present invention also provides for a "dark mode" where location information relating to the mobile application is not shared with other mobile devices.

Distances between mobile devices is operable to be determined via any method known in the art using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Chat functionality and commerce functionality are also provided by the mobile application of the present invention. Specifically, an account is operable to communicate with friend accounts or provide payments to friend accounts when the mobile device associated with the account is within a predetermined distance of the other mobile devices associated with the friend accounts.

Figure 4:
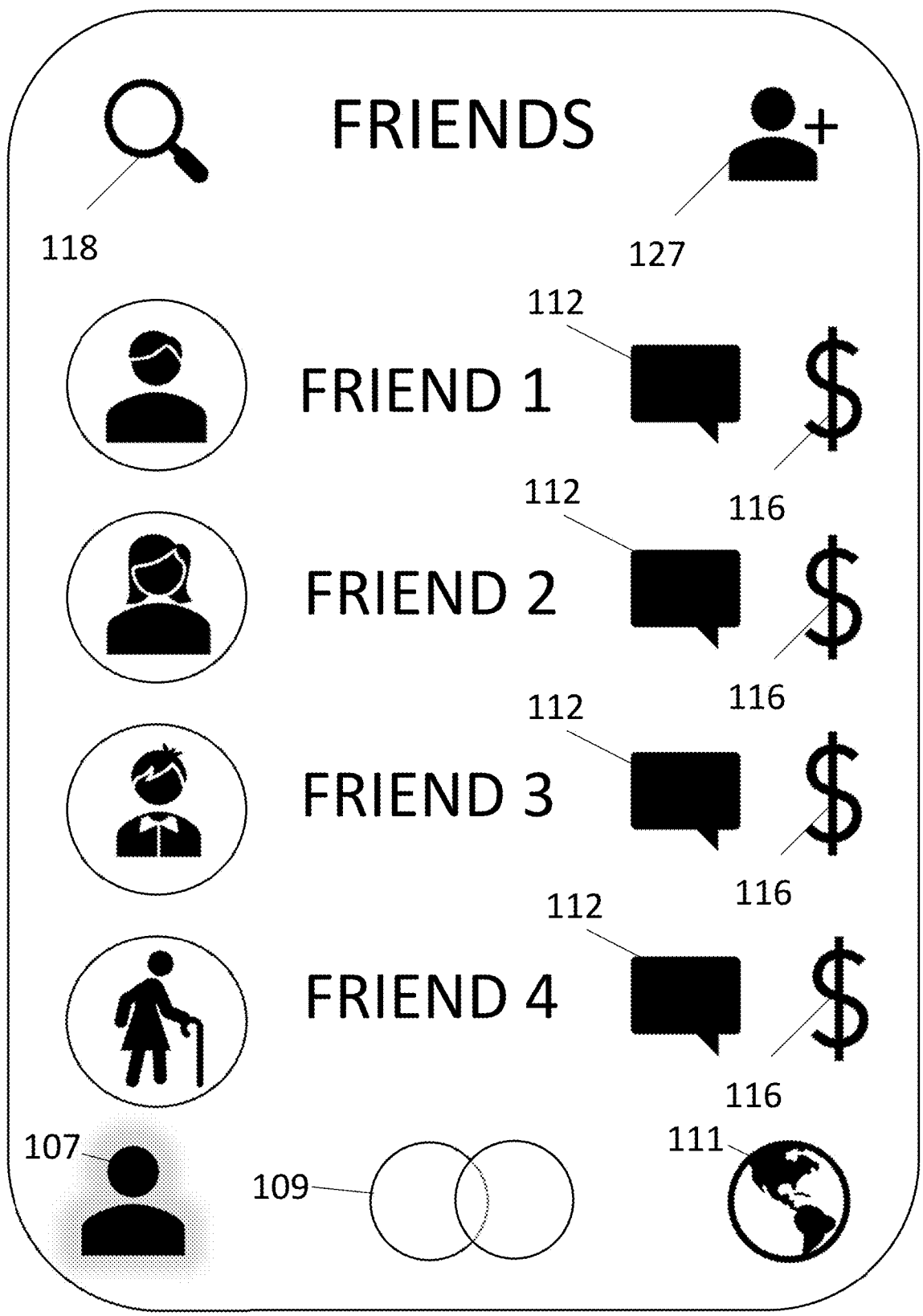
FIG. 4 illustrates a GUI for a friend list menu according to one embodiment of the present invention.

FIG. 4 illustrates a GUI for a friend page according to one embodiment of the present invention. In FIG. 4, the head and shoulders icon 107 emits a glow to indicate that the GUI is currently displaying the friends page. Preferably, the glow is white. The GUI includes a list of friend accounts as well as messaging icons 112 and payment icons 116 next to each friend account in the list. Additionally, the present application includes a search button 118 operable to search a user's friend list. In order to add a friend, the add friend icon 127 is selected and identifying information for the user for whom the friend request is to be sent is entered (e.g., mobile phone number, username, email address, etc.). The add friend icon 127 also provides a list of any incoming friend requests. Each friend name or avatar next to each name is configured to redirect the application to the profile page for that friend upon touch activation of the friend name or avatar. The profile page also includes functionality for removing the friend from the friends list. Upon removal of a friend account, the former friend account is not notified, but the account of the user who removed the friend account is removed from the former friend account's friend list. Activation of a messaging icon 112 opens a messaging page for that friend. Alternatively, swiping right on the name or avatar associated with the friend account opens the messaging page for that friend. Activation of the dollar sign next to the friend's name opens a pop-up window with a list of payment options for the friend, including payment options such as VENMO, PAYPAL, GOOGLE PAY, and APPLE PAY.

Activation of the messaging icon is operable to open a chat window which enables an account to send text, images, videos, audio, and/or any other content or file type to the friend account. In one embodiment, the chat is terminated and exited once one of the devices in the chat is no longer within a predetermined proximity of the other device. In another embodiment, the chat is saved once one of the devices in the chat is no longer within a predetermined proximity of the other device and the chat is reopened upon the devices coming back within a predetermined proximity of each other. In one embodiment, there is a time limit for the devices to come back within a predetermined proximity of each other before the chat is deleted (ex: 5 minutes, 10 minutes, 15 minutes, 1 hour, 4 hours, 24 hours, 1 week, 1 month, etc.). In one embodiment, the chat is deleted after a user-specified time. Alternatively, the mobile application of the present invention provides for group chat functionality, with a group of mutual friends being operable to message each other in a group chat as long as the devices associated with each of the friends is within a predetermined proximity of the other devices. When a radius of a device associated with one of the accounts no longer intersects radii of each of the other devices associated with the accounts in the chat, the application running on that device automatically exits the group chat. Alternatively, group chats require a radius overlap between an account and only one other account in the group chat such that a "chain" group chat is created. Group chats are also operable to be customizable, with an account which is invited to the group chat being operable to invite any friend account within a predetermined radius of the account to the group chat for a friends group chat and being operable to invite any account within a predetermined radius of the account to the group chat for a public group chat.

The payment icon is operable to provide payment from an account to the selected friend account. In one embodiment, payment information including credit card information or debit card information is stored in the account. Alternatively, the application is operable to link to a third-party payment service such as VENMO, PAYPAL, or any other P2P payment software. In another embodiment, the application is operable to provide payment between accounts via cryptocurrencies such as Bitcoin or ETHEREUM.

Alternatively, usernames, names, icons, or any other content representing an account is operable to be selected in the left-hand circle of FIG. 3 or the circles around the perimeter of the central circle to provide messaging and/or payment functionality between accounts.

The mobile application of the present invention also includes a "public mode" wherein any devices which have installed the application are operable to view that the mobile device running the mobile application is within a predetermined proximity. Importantly, the home page of the application, as displayed in FIGS. 2-3, only lists friend names or friend usernames.

Figure 5:
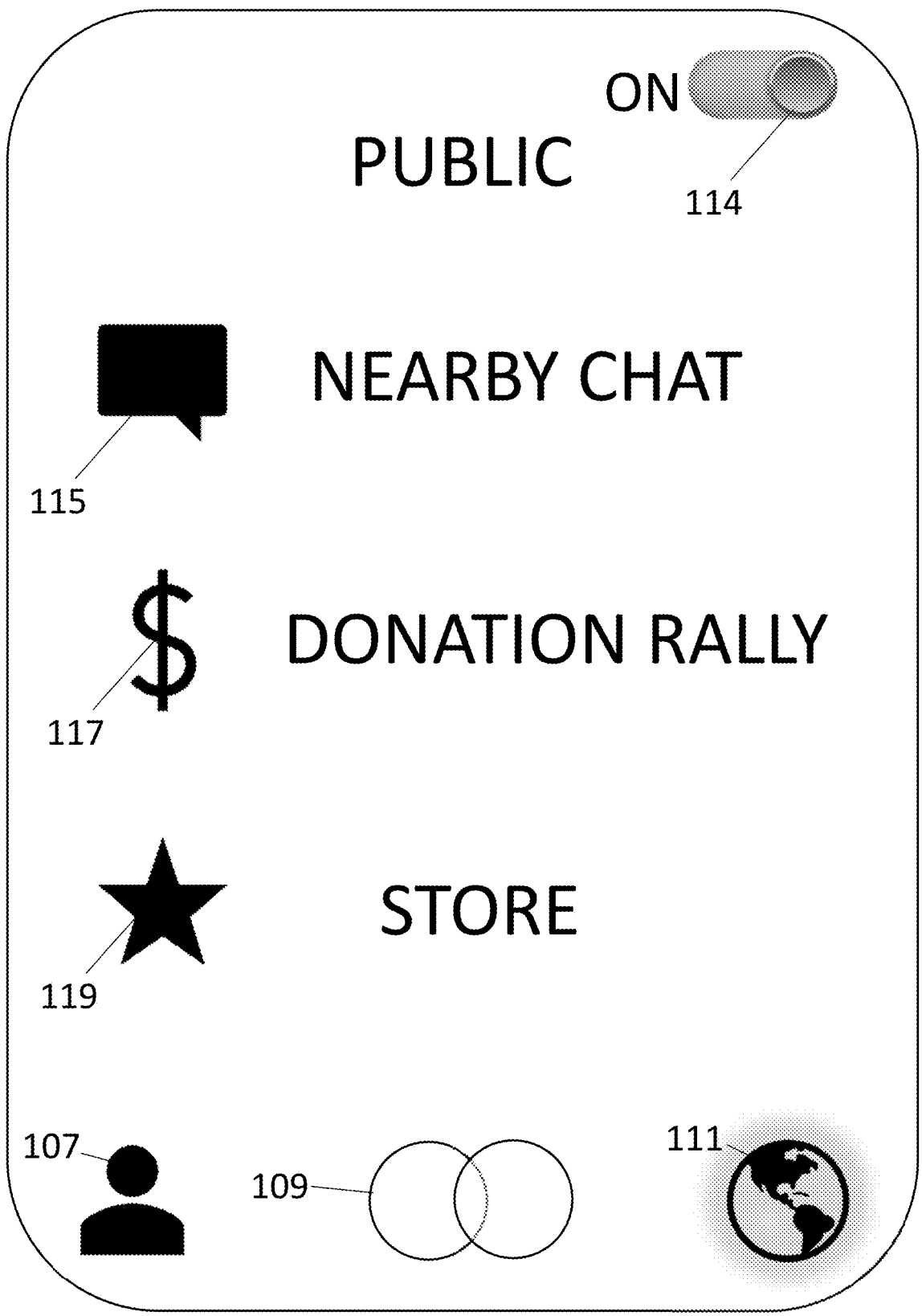
FIG. 5 illustrates a GUI for a public menu according to one embodiment of the present invention.

FIG. 5 illustrates a GUI for a public menu according to one embodiment of the present invention. In FIG. 5, the Earth icon 111 emits a glow to indicate that the GUI is currently displaying the public menu page. The public menu page is accessed by swiping left from the home page, such as the home page illustrated in FIGS. 2-3, or through activation of the Earth icon 111 at the bottom of the GUI. The public menu page includes a nearby chat button 115, which is operable to open a list or visual representation of accounts within a predetermined proximity of the mobile device running the mobile application. The public menu page also includes a donation rally button 117 and a store button 119. These buttons are configured to be accessed only when the public mode slider button 114 is set to "ON" as in FIG. 5.

Figure 6:
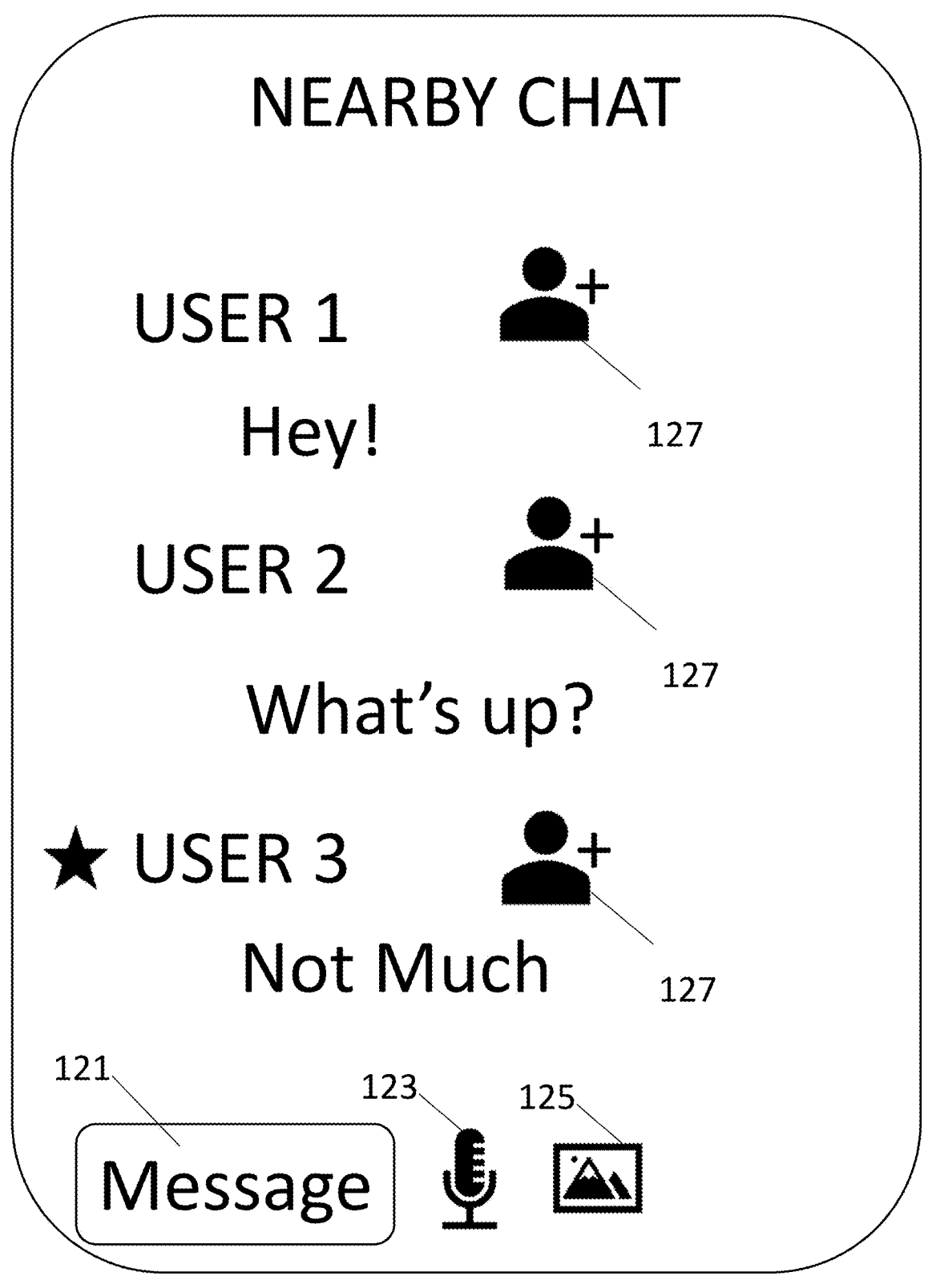

FIG. 6 illustrates a GUI for a nearby chat according to one embodiment of the present invention. Preferably, the nearby chat includes all users with devices running the application within a predetermined radius of a device running the application, such as within 500 feet of the device running the application. Alternatively, the nearby chat is a chat accessible to all devices within a predetermined radius of a radius of a predetermined location who have public mode turned on for their application. In one embodiment, a business, school, workplace, or church serves as a predetermined location. Accordingly, a public chat for a STARBUCKS location is operable to be joined by any account in public mode within a predetermined proximity of the STARBUCKS location. These public chats are operable to be terminated and deleted when no device is within a predetermined proximity of the predetermined location. Alternatively, the public chat is saved and is operable to be accessed the next time a device enters within a predetermined proximity of the radius of the predetermined location. Any user who is in the nearby chat list can click on the "Message" button 121 to send a message to the group, the microphone button 123 to send an audio message to the group, or the picture icon 125 to send a picture or video either from the device's camera roll or the live camera. The nearby chat includes all users associated with devices running the application with public mode enabled within a predetermined proximity of the device running the application. Notably, this means that the nearby chat includes friends and users who are not friends. New friends can be added from the nearby chat window through activation of the add friend button 127 next to the user name in the chat. Only people who have communicated in the nearby chat are displayed in the list and can be added as friends through the application.

Figure 7:
FIG. 7 illustrates a GUI for a donation rally according to one embodiment of the present invention

The donation rally button 117 of FIG. 5 is operable to redirect the mobile application to a donation rally page, which indicates the organization conducting the donation rally, the cause for which the organization is raising donations, and the progress towards the donation goal. FIG. 7 illustrates a GUI for a donation rally according to one embodiment of the present invention. A donate button 129 redirects the mobile application to a donation page where the user can donate to the donation rally. Advantageously, an account is rewarded with an icon for the account profile upon the account donating to the donation rally. Alternatively, an icon or other visual indication indicating that the account has donated to a cause is displayed next to the username, user image, etc. Different donation levels and different causes are operable to be associated with different icons or other different visualizations for the usernames, user images, etc. Organizations are approved in advance for a donation rally and must provide a valid payment account link (such as PAYPAL).

Figure 8:
FIG. 8 illustrates a GUI for a store according to one embodiment of the present invention
Figure 8:
Figure 8:
Figure 8:
Figure 8:

Activation of the store button in FIG. 5 is operable to redirect the mobile application to a store page, where an account is operable to purchase icons such as stars or other indicators of value. The icons are purchased by activating a buy button 131 and paying through a payment account such as PAYPAL. FIG. 8 illustrates a GUI for a store according to one embodiment of the present invention. The purchased icons are associated with the account profile or appear next the username, user picture, or other representation of the user account in the circles of FIG. 3. In one embodiment, the icons are permanent. In another embodiment, each icon has a monthly subscription such that the account must pay a monthly fee so that the icon remains associated with the account.

Notably, the application of the present invention provides end-to-end data encryption and follows General Data Protection Regulation protocols. The exact geolocation of devices running the application are never shared.

Figure 9:
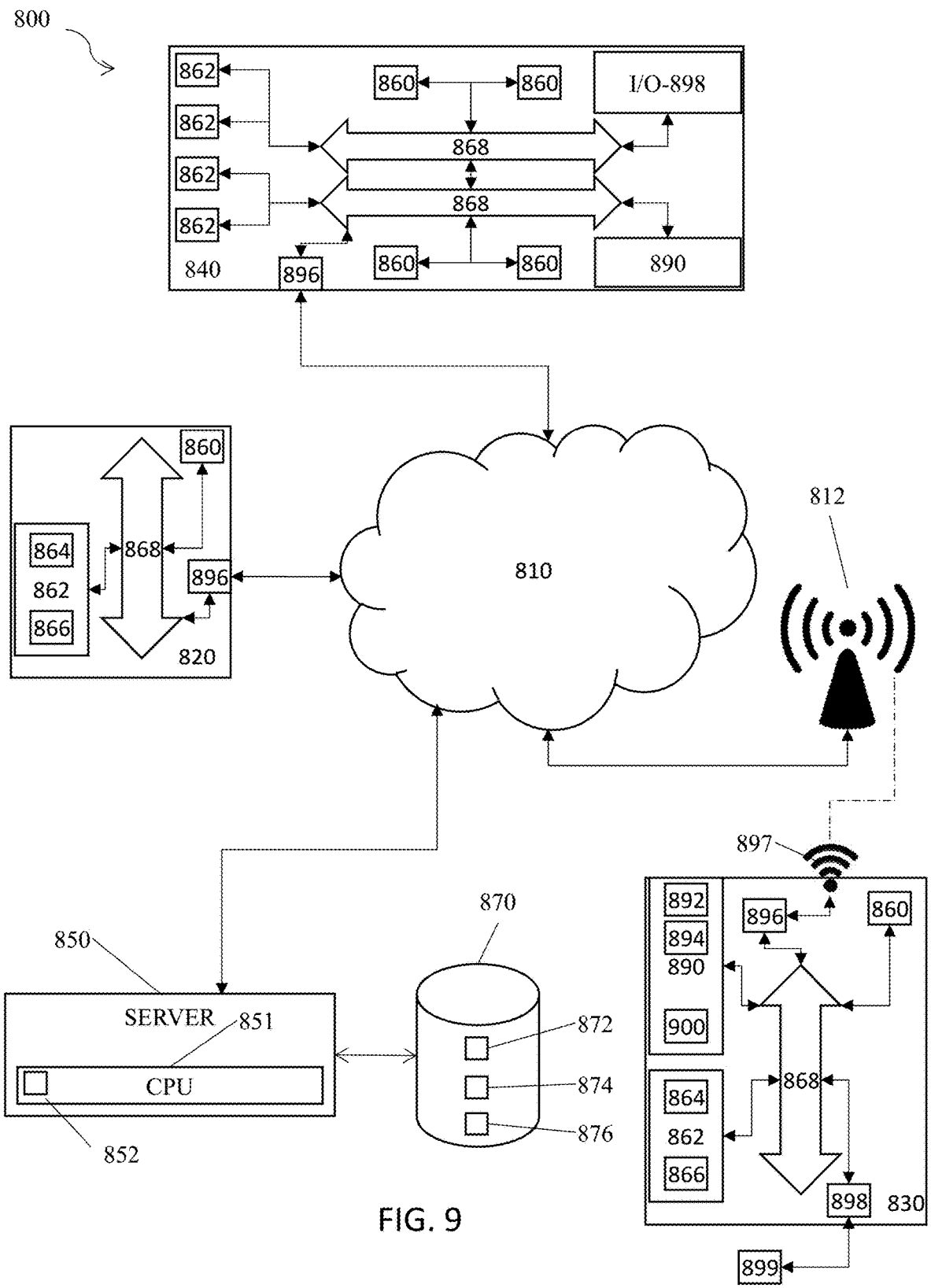
FIG. 9 is a schematic diagram of a system of the present invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for a location-based social network comprising:
   at least one server computer including a processor, a memory, and at least one database; a mobile device, wherein the mobile device includes an application; and
   at least one other mobile device, wherein the at least one other mobile device includes the application;
   wherein the at least one server computer is in network communication with the mobile device and the at least one other mobile device;
   wherein an account associated with the mobile device is linked to at least one other account associated with the at least one other mobile device;
   wherein the at least one database includes device and user data, and wherein the device and user data includes location data;
   wherein the application includes a graphical user interface (GUD), wherein the GUI includes a visual representation of a proximity of the mobile device to the at least one other mobile device; and
   wherein the application is further operable to provide account management functionality, chat functionality, and commerce functionality;
   wherein the visual representation of the proximity of the mobile device to the at least one other mobile device includes a first circle and a second circle, wherein the first circle represents the mobile device and the second circle represents the at least one other mobile device, wherein the first circle and the second circle overlap or touch when the proximity is within a predetermined proximity, and wherein the first circle and the second circle do not overlap or touch when the proximity is greater than the predetermined proximity.

2. The system of claim 1, wherein the mobile device is a smart phone, a mobile phone, a laptop computer, a tablet, or a phablet.

3. The system of claim 1, wherein the at least one database further includes application data for the application.

4. The system of claim 1, wherein the application is accessed using biometric information.

5. The system of claim 1, wherein the mobile device and the at least one other mobile device are provided simultaneously with a notification in real time that the mobile device and the at least one other mobile device are within a predetermined proximity.

6. The system of claim 1, wherein the application is operable to blackout sharing the location data for at least one blackout location, and wherein a radius around the at least one blackout location is user defined.

7. The system of claim 1, wherein the location data is created via a global positioning system (GPS), a beacon, a wireless network, radio frequency (RF), RF identification (RFID), near field communication (NFC), an internet protocol (IP) address, magnetic positioning, and/or cellular triangulation.

8. The system of claim 1, wherein the at least one other account includes at least two accounts, wherein the application is operable to provide at least two tiers for the at least two accounts, wherein each of the at least two tiers is associated with a corresponding predetermined proximity, and wherein the application provides notifications based on the corresponding predetermined proximity.

9. The system of claim 1, wherein the account includes a user name, a password, an image associated with the account, privacy preferences, a gender, a residency, a mailing address, and/or a date of birth.

10. The system of claim 1, wherein the application is a web-browser based application operable to be accessed through a web browser running on the mobile device.

11. The system of claim 1, wherein the application is a mobile application installed on the mobile device.

12. The system of claim 1, wherein the visual representation includes a name, a user name, and/or an image associated with the at least one other account.

13. The system of claim 1, wherein the visual representation of the proximity of the mobile device to the at least one other mobile device is displayed in order of increasing distance.

14. A system for a location-based social network comprising:
   at least one server computer including a processor, a memory, and at least one database; a mobile device, wherein the mobile device includes an application; and
   at least one other mobile device, wherein the at least one other mobile device includes the application;
   wherein the at least one server computer is in network communication with the mobile device and the at least one other mobile device;
   wherein an account associated with the mobile device is linked to at least one other account associated with the at least one other mobile device;
   wherein the at least one database includes device and user data, and wherein the device and user data includes location data;
   wherein the location data is created via a global positioning system (GPS), a beacon, a wireless network, radio frequency (RF), RF identification (RFID), near field communication (NFC), an internet protocol (IP) address, magnetic positioning, and/or cellular triangulation;
   wherein the application includes a graphical user interface (GUD), wherein the GUI includes a visual representation of a proximity of the mobile device to the at least one other mobile device;
   wherein the mobile device and the at least one other mobile device are provided simultaneously with a notification in real time that the mobile device and the at least one other mobile device are within a predetermined proximity; and
   wherein the application is further operable to provide account management functionality, chat functionality, and commerce functionality;

wherein the visual representation of the proximity of the mobile device to the at least one other mobile device includes a first circle and a second circle, wherein the first circle represents the mobile device and the second circle represents the at least one other mobile device, wherein the first circle and the second circle overlap or touch when the proximity is within the predetermined proximity, and wherein the first circle and the second circle do not overlap or touch when the proximity is greater than the predetermined proximity.

15. The system of claim 14, wherein the mobile device is a smart phone, a mobile phone, a laptop computer, a tablet, or a phablet.

16. The system of claim 14, wherein the application is operable to blackout sharing the location data for at least one blackout location, and wherein a radius around the at least one blackout location is user defined.

17. A system for a location-based social network comprising:
- at least one server computer including a processor, a memory, and at least one database;
- a mobile device, wherein the mobile device includes an application; and
- at least one other mobile device, wherein the at least one other mobile device includes the application;
- wherein the at least one server computer is in network communication with the mobile device and the at least one other mobile device;
- wherein an account associated with the mobile device is linked to at least one other account associated with the at least one other mobile device;
- wherein the at least one database includes device and user data, and wherein the device and user data includes location data;
- wherein the location data is created via a global positioning system (GPS), a beacon, a wireless network, radio frequency (RF), RF identification (RFID), near field communication (NFC), an internet protocol (IP) address, magnetic positioning, and/or cellular triangulation;
- wherein the application includes a graphical user interface (GUD), wherein the GUI includes a visual representation of a proximity of the mobile device to the at least one other mobile device when the mobile device is within a predetermined proximity to the at least one other mobile device;
- wherein the application is operable to blackout sharing the location data for at least one blackout location, and wherein a radius around the at least one blackout location is user defined; and
- wherein the application is further operable to provide account management functionality, chat functionality, and commerce functionality;
- wherein the visual representation of the proximity of the mobile device to the at least one other mobile device includes a first circle and a second circle, wherein the first circle represents the mobile device and the second circle represents the at least one other mobile device, wherein the first circle and the second circle overlap or touch when the proximity is within a predetermined proximity, and wherein the first circle and the second circle do not overlap or touch when the proximity is greater than the predetermined proximity.

* * * * *